(12) United States Patent
Markham et al.

(10) Patent No.: US 8,819,833 B2
(45) Date of Patent: Aug. 26, 2014

(54) ASSURED PIPELINE THREAT DETECTION

(75) Inventors: Thomas R. Markham, Morristown, NJ (US); Kevin P. Staggs, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 42 days.

(21) Appl. No.: 13/410,033

(22) Filed: Mar. 1, 2012

(65) Prior Publication Data

US 2013/0067558 A1 Mar. 14, 2013

Related U.S. Application Data

(60) Provisional application No. 61/448,081, filed on Mar. 1, 2011.

(51) Int. Cl.
*H04L 12/26* (2006.01)
*G06F 11/36* (2006.01)

(52) U.S. Cl.
USPC .............................................. 726/25; 726/22

(58) Field of Classification Search
None
See application file for complete search history.

(56) References Cited

U.S. PATENT DOCUMENTS

| 2004/0078592 | A1* | 4/2004 | Fagone et al. | 713/201 |
|---|---|---|---|---|
| 2007/0214505 | A1* | 9/2007 | Stavrou et al. | 726/24 |
| 2009/0044270 | A1* | 2/2009 | Shelly et al. | 726/22 |
| 2011/0023114 | A1* | 1/2011 | Diab et al. | 726/22 |

OTHER PUBLICATIONS

ReVirt:Enabling Intrusion Analysis through Virtual-Machine Logging and Replay. Dunlap et al. USENIX(2002).*
Scability, Fidelity and Containment in the Potemkin Virtual Honeyfarm. Vrable et al. ACM(2005).*

* cited by examiner

*Primary Examiner* — Venkat Perungavoor
(74) *Attorney, Agent, or Firm* — Brooks, Cameron & Huebsch, PLLC

(57) ABSTRACT

Devices, methods, and systems for assured pipeline threat detection are described herein. One method for assured pipeline threat detection includes receiving a first set of data at a firewall from an unsecured network, moving the first set of data from the firewall to a number of virtual machines, performing a number of threat detection analyses on the first set of data in the number of virtual machines that are organized in a first assured pipeline, and sending the first set of data to a secured target network if no threat was detected.

15 Claims, 3 Drawing Sheets

ASSURED PIPELINE THREAT DETECTION

CROSS REFERENCE TO RELATED APPLICATION

This application is a non-provisional of U.S. Provisional Application Ser. No. 61/448,081, filed Mar. 1, 2011, the entire specification of which in incorporated herein by reference.

TECHNICAL FIELD

The present disclosure relates to devices, methods, and systems for providing security guard architecture for computing device threat protection.

BACKGROUND

Computing devices are utilized for a variety of purposes. For instance, some computing devices are utilized for accomplishing classified, confidential, or high security tasks. These computing devices can be targets for potential penetration to, for example, access and take over control of the system, remove data, and/or tamper with the data or the system. For instance, computing devices controlling power grids or other infrastructure systems, as well as financial, medical, scientific, military, and/or business systems, may be some of the types of systems that could be potential targets, among others.

Generally, two approaches have been utilized to secure these computing devices. One is the use of one or more firewalls that are designed to identify and reject threats as they attempt to access the secured computing device from an unsecured or lesser secured network. These firewall configurations may be known to the attackers and in some instances can be compromised by them.

A second approach is sometimes referred to as an "air gap" method in which the computing device to be secured is not connected to any lesser secured networks or devices and data can only be accessed by connecting a memory device such as a memory card or hard drive via a wired type of connection. However, these systems can be difficult to be utilized because they are isolated from other networks where information may be present. Further, data and/or files may be transported on these memory devices and transferred to the computing device, in some cases without the knowledge of the individual doing the connecting of the memory device to the computing device.

DETAILED DESCRIPTION

Figure 1:
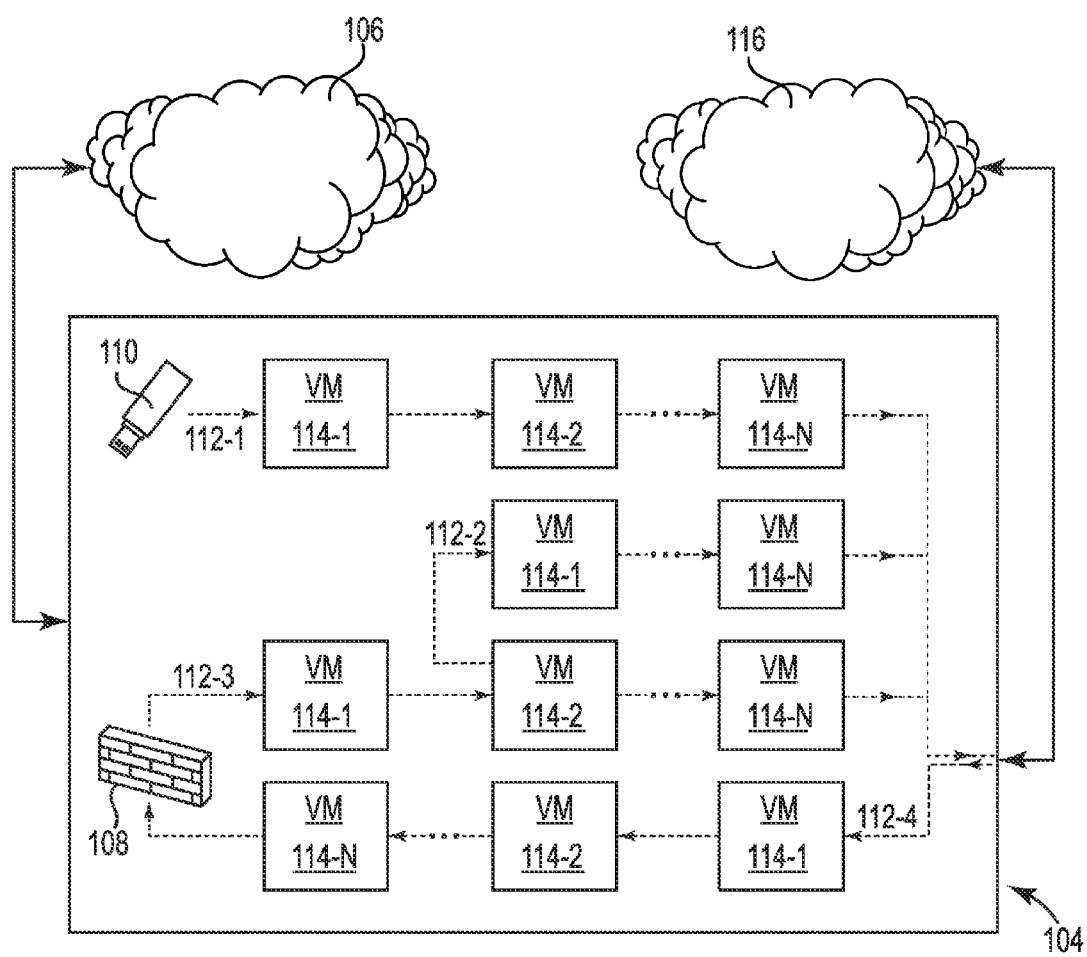
FIG. 1 illustrates an assured pipeline threat detection system in accordance with one or more embodiments of the present disclosure.

Devices, methods, and systems for threat detection using an assured pipeline are described herein. For example, one or more embodiments include receiving a first set of data at a firewall from an unsecured network, moving the first set of data from the firewall to a number of virtual machines, performing a number of threat detection analyses on the first set of data in the number of virtual machines that are organized in a first assured pipeline, and sending the first set of data to a secured target network if no threat was detected.

Embodiments of the present disclosure can detect threats using a number of assured pipelines. That is, a guard system can detect threats, e.g., security threats, in data from an unsecured network before the data is allowed into a secured network. Furthermore, a guard system can detect security threats in data from a secured network before the data is sent to an unsecured network. A guard system can detect threats in data by employing an assured pipeline that can include a number of virtual machines. The number of virtual machines can include a number of threat detection programs that can detect threats in data.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of widgets" can refer to one or more widgets.

FIG. 1 illustrates an assured pipeline threat detection system in accordance with one or more embodiments of the present disclosure. A threat detection system can include a guard system 104. A guard system 104 can be connected to an unsecured network 106 and a secured network 116. A guard system 104 can include a number of assured pipelines (e.g., 112-1, 112-2, 112-3, 112-4). The number of assured pipelines can allow data (e.g., Internet traffic, files, data streams) to travel from an unsecured network 106 to a secured network 116 and data to travel from a secured network 116 to an unsecured network 106.

In a number of embodiments of the present disclosure, a guard system 104 can receive data from an unsecured network 106. An unsecured network 106 can include a source of data that is external to a guard system 104, that is connected to the guard system 104, and that is not classified as secured. For example, an unsecured network 106 can include a first network that is connected to the Internet and is external to a second network 116 that can include a guard system 104, the second network being classified as secure. A guard system 104 can intercept data that is requested to be passed between a secured network 116 and an unsecured network 106 or a request for data to be passed between a secured network 116 and an unsecured network 106. For example, a guard system 104 can intercept data that a user in a secured network 116 requested from an unsecured network 106.

Data can include information contained in any signal that is delivered to a secured network or unsecured network. For example, data can include a digital signal that includes information such as executable instructions, information used by executable instructions, a digital file or a number of digital files.

A digital file can include raw data such as a word processing file or a spreadsheet file. A digital file can include other types of raw data not listed above. A digital file can also include a source code file. In some examples, a source code file can be used to create executable instructions. A source code file can include source code for a number of programming languages.

Data can also include a digital signal that can include set of executable instructions such as a file with an .EXE extension. Executable instructions can include executable instructions developed for a number of platforms (e.g., operating systems (OS)). A number of platforms can include a Linux OS, a Microsoft OS, or a Solaris OS. However, a number of platforms is not limited to the recited operating systems and can include any operating systems.

Data can be received from an unsecured network and sent to a secured network through a physical connection or a wireless connection. For example, a guard system 104 can include a number of network interface cards that can be connected to an unsecured network and/or a secured network through a physical connection. Alternatively, a guard system 104 can include a number of network interface cards that can be connected to an unsecured network and/or a secured network through a wireless connection that can include a number frequencies and/or wireless devices.

A guard system 104 can include a security enhanced OS capable of enforcing one or more non-bypassable and tamper resistant virtual networks (e.g., assured pipelines). Such secured enhanced OS can include, for example, Security Enhanced Linux (SELinux). One advantage of a security enhanced OS can include type enforcing, discussed in more detail below, which can provide for implementations of assured pipelines, e.g., virtual networks, within a guard system 104.

A guard system 104 can include a firewall 108 and although illustrated as within the guard system 104, the firewall 108 can be provided outside the guard system 104. A firewall 108 can filter network traffic according to a set of rules.

Any number of applications that implement a firewall can be used. For example, a firewall application can include a CISCO PIX firewall or SIDEWINDER firewall. Data can be received by a firewall 108 and data can be directed to a number of assured pipelines. For example, data can move from a firewall 108 to an assured pipeline 112-3.

In some embodiments, a guard system 104 can receive data from a portable memory device 110. For example, a guard system 104 can receive data from a flash drive. The guard system 104 can direct the data from a flash drive to an assured pipeline 112-1.

Assured pipelines can move data between different domains if a set of processing steps have occurred. For example, assured pipelines 112-1, 112-2, 112-3, and 112-4 (referred to generally as assured pipelines 112), can each function to move data between virtual machines if a set of processing steps have occurred.

An assured pipeline can be non-bypassable, tamperproof, and verifiable. These functions can be accomplished, for example, by using type enforcing, as found in security enhanced OS.

Type enforcing can associate an identifier with a domain. The domain identifier can be used to enforce a set of rules or policies.

Furthermore, type enforcing can function to enforce a set of rules or policies by enforcing a mandatory access control (MAC). MAC can include a type of access control that constrains or allows a domain to access and/or perform an operation.

Type enforcing can function to enforce a set of rules by comparing a domain identifier with a set of rules and or policies and determining if the domain identifier (e.g., domain that the domain identifier identifies) has permission to access and/or perform an operation. By enforcing a set of rules for a specific domain, type enforcing can be non-bypassable, tamperproof, and verifiable. That is, type enforcing can function to assure that a domain does not bypass a set of processing steps.

Type enforcing can function to assure that a domain does not access and/or perform a set of operations. Type enforcing can also function to assure that a domain is identified.

In a number of embodiments of the present disclosure, a domain can, for example, include a virtual machine. For instance, assured pipelines 112, can be directed through a number of virtual machines that can function as domains. In such embodiments, a virtual machine can include an isolated OS.

A virtual machine can be implemented on one or more computing devices using software emulation and/or hardware virtualization. In some embodiments, the virtual machines can include a number of platforms. That is, an assured pipeline can be directed through one or more virtual machines that can include one or more platforms running on each virtual machine.

The one or more platforms can include a number of programs for performing a number of threat detection tests (e.g., threat detection analysis). Such programs can include programs that are intended for use on different platforms. For example, a first threat detection program can be intended for use on a first platform while a second threat detection program can be intended for use on a second platform, the second platform differing from the first platform.

In some embodiments, an assured pipeline can include a number of virtual machines each of which can run a potentially different platform such that each of the virtual machines can run one or more potentially different threat detection programs. In some embodiments, the multiple virtual machines and/or threat detection tests can be arranged sequentially, such that the data passes through one virtual machine or threat detection test before it passes to the next virtual machine or threat detection test.

In such a manner, a guard system 104 can incorporate use of "best of breed" programs due to the use of virtual machines. Best of breed refers to the flexibility that a virtual machine environment can have in being able to use threat detection programs that were intended for different platforms (e.g., different OS) in a single platform (e.g., security enhanced OS) with a virtual machine environment having different platform capability.

In a number of embodiments of the present disclosure, a guard system 104, which can receive data from an unsecured network 106, can perform a first set of threat detection tests. Threat detection tests can detect security threats in data.

For example, a security threat can be detected in encrypted code and/or data, obfuscated code, self-modifying code, and/or unusual system calls, although security threats can be detected in a number forms of data.

Threat detection tests can include a number of tests. Some such tests can include, for example, static data analysis, dynamic data analysis, and sandbox analysis.

A static data analysis can include a number of analyses that can analyze data, for instance, as stand alone data. For example, source code can be analyzed as stand alone data for security threats.

A dynamic analysis of data can include an analysis of data, for instance, as it is executed. For example, data that includes a set of executable instructions can be executed and the interactions between the executable instructions (e.g., executable instructions as they are being executed) and a system can be analyzed.

Data analysis (e.g., threat detection tests) can further include a sandbox analysis. A sandbox analysis can include installing the data, if the data includes executable instructions or data that can be converted into executable instructions, and monitoring a virtual machine (e.g., the virtual machine in which the sandbox analysis is being conducted).

The virtual machine can be monitored for network traffic and/or system behavior. For example, a set of executable instructions (e.g., data) can be executed in a first virtual machine, the set of executable instructions can include a program that can be installed in a virtual machine.

In such an example, the virtual machine can be monitored for abnormalities in system behavior such that a security threat can be detected when the virtual machine, and by extension the OS running on the virtual machine, functions or behaves in a manner indicative of the existence of a security threat.

Additionally, in some embodiments, a virtual machine can be monitored for network traffic. In some examples, the set of executable instructions can request additional data (e.g., network traffic) and the network traffic can be monitored for behavior indicative of the existence of a security threat.

In a number of embodiments of the present disclosure, a first virtual machine 114-1 in an assured pipeline 112-3 can receive data from a firewall 108. The first virtual machine 114-1 can perform a first threat detection.

The first virtual machine 114-1 can then send the data to a second virtual machine 114-2 only if the first virtual machine 114-1 has followed a set of processing steps. A set of processing steps can be defined specifically for a virtual machine. For example, a first virtual machine 114-1 can have a first set of processing steps that correspond to the use of a first threat detection program (e.g., first threat detection program running on the first virtual machine 114-1).

After the first virtual machine 114-1 has sent the data to a second virtual machine 114-2, the second virtual machine 114-2 can include a second set of processing steps (e.g., that correspond to the use of a second threat detection program). The second virtual machine 114-2 can then send the data to a next virtual machine 114-N that can have an N set of processing steps (e.g., that can correspond to the use of an N detection program).

If no threats have been found as the data passes through the pipeline, the data can be delivered to the secured network 116 by guard system 104. In such a manner, the guard system 104 can determine if a security threat exists and can stop delivery of the data. For example, guard system 104 can determine that a security threat exists at a first virtual machine 114-1 and can stop the delivery of the data from the first virtual machine 114-1 to the second virtual machine 114-2.

In some embodiments, a guard system 104 can determine that a threat exists at a virtual machine and allow the data to move through the remainder of the virtual machines. The guard system 104 can stop the data from being sent to the secured network 116 at the last virtual machine 114-N in an assured pipeline. That is, the guard system 104 can determine if the data can be delivered to a secured network 116 based on the outcome of the threat detection tests performed in the virtual machines, e.g., 114-1, 114-2, through 114-N, that preceded the last virtual machine 114-N, before during or after the data passes through the last virtual machine 114-N.

In a number of embodiments of the present disclosure, each of the virtual machines can create a security report, of the threat detection tests it conducted. For instance, the file can be stored within the virtual machine or elsewhere in the secured network at a location that the guard system 104 can access.

For example, a first virtual machine 114-1 can report the threat detection tests that it conducted in a log file that the guard system 104 can access. The guard system 104 can access the log file before a first virtual machine 114-1 sends the data to a second virtual machine 114-2. In such embodiments, the guard system 104 can, for example, deny the delivery of the data from a first virtual machine 114-1 to a second virtual machine 114-2 based on the results of the first threat detection tests.

In some embodiments of the present disclosure, each of the virtual machines can include a security report of the threat detection tests it conducted in a log file that the guard system 104 and the last virtual machine 114-N can access. For example, a first virtual machine 114-1 can create a report of the results of the threat detection tests that it conducted in a log file that the guard system 104 and the last virtual machine 114-N can access.

The last virtual machine 114-N can access the log file before a last virtual machine 114-N sends the data to a secured network 116. In such an embodiment, the last virtual machine 114-N can be utilized to deny the delivery of the data from a first virtual machine 114-1 to a second virtual machine 114-2 based on the log file.

In some embodiments, the security reports (e.g., log files) of the threat detection tests can include, for example, an association of the data to the identity of a user that requested the data. This can be beneficial, for example, as users can be deterred from requesting data that is likely to include security threats due to the inclusion of user identifications in security reports. The inclusion of user identification can also allow analysis of security weaknesses among the clients that can request data from within the secured network 116.

In some embodiments, a virtual machine, in the course of implementing a threat detection test on a first set of data through the use of a threat detection program, can request of a second set of data. In some such embodiments, a virtual machine can start a new assured pipeline that can receive the second set of data. The second assured pipeline can perform a number of threat detection tests on the second set of data and either report the results to the guard system (e.g., virtual machine) or send the second set of data to a secured network depending on the results of the security tests.

For example, a second virtual machine 114-2 in a first assured pipeline 112-3 can receive a first set of data. The second virtual machine 114-2, in the course of conducting a second set of threat detection tests, can request that a second set of data be received in order to complete the second set of threat detection tests on the first set of data.

In such an example, the second virtual machine 114-2 can receive the second set of data and the second virtual machine 114-2 can initiate a second assured pipeline 112-2. The second assured pipeline 112-2 can conduct independent threat detection tests on the second set of data. In examples where a first virtual machine in a first assured pipeline initiates a second assured pipeline, the first assured pipeline can be referred to as a parent assured pipeline and the second assured pipeline can be referred to as a child assured pipeline.

In a number of embodiments of the present disclosure, a first assured pipeline 112-3 can communicate with a second assured pipeline 112-2. That is, the virtual machines in a first assured pipeline 112-3 can communicate with the virtual machines in a second assured pipeline 112-2.

Communication between virtual machines of different assured pipelines can include a number of limitations and/or protocols. For example, communication between virtual machines in different assured pipelines can be limited to communications between parent/child assured pipeline pairs.

For instance, a first virtual machine in a first assured pipeline 112-3 can communicate with a second virtual machine in a second assured pipeline 112-2 if the first assured pipeline 112-3 is a parent assured pipeline and the second assured pipeline 112-2 is a child assured pipeline.

In some embodiments, communication can be limited to unidirectional communications. For example, communication can be limited to parent assured pipelines sending messages to child assured pipelines or child assured pipelines sending a messages to parent assured pipelines.

A guard system 104 can receive data from a secured network 116 and direct the data to a fourth assured pipeline 112-4. The fourth assured pipeline 112-4 can perform a number of threat detection tests as previously described.

However, a set of threat detection tests for data received from a secured network can differ from a set of threat detection tests for data received from an unsecured network. For example, a threat detection test can be utilized to detect a threat in data that is intended to remain internal to a secured system 116.

Furthermore, in some embodiments, a guard system 104 can stop the delivery of data to a first client when the data was intended for delivery to a second client. Additionally, a guard system 104 can stop the delivery of files that include attachments that are not authorized, in some embodiments.

In some such embodiments, if no threats are detected, the guard system 104 can send the data to a firewall 108. The firewall 108 can send the data to an unsecured network 106.

In some embodiments, a guard system 104 can include a file server. Furthermore, in some embodiments, a firewall can include a firewall that is aware of the system context and can take into account ports and/or protocols allowed through the firewall (e.g., system context).

In some such embodiments, a deep packet inspection process can be used to determine if the data in the packet is consistent with the system context, by taking a system context into account. In some embodiments, if the packet is not consistent, the packet can be assumed to include a security threat and can be dropped, for example.

A guard system 104, in some embodiments, can include the ability to allow data that is accompanied with a known signature to be delivered to the secured network 116 or to the unsecured network 106 without going through an assured pipeline. For example, data can include a signature when the data has constraints that have been qualified.

A signature can include a mechanism for recognizing the source of the data. For example, in some applications, data can include data with time constraints, such as time sensitive data, that requires a different treatment than data that is not time sensitive.

In such an embodiment, a guard system 104, upon receipt of a signature, can compare the signature with a list of authorized signatures and can allow the data that accompanies the signature to be delivered to a secured network 116 without being required to pass through an assured pipeline. In some embodiments, signatures can be checked, for example, against a list of approved signatures stored in memory.

In some embodiments, some data can be classified as non-threatening data (e.g., no hidden data could be contained in the data) and therefore can be passed by the guard system between the secured network and non-secured network without being required to pass through an assured pipeline. For example, data can be checked against a list of approved data stored in memory.

A security guard can be limited to detecting threats in incoming data traffic (e.g., receiving data from an unsecured network 106) or detecting threats in outbound data traffic (e.g., sending data from an unsecured network 106). Although FIG. 1 depicts a security guard 104 that incorporates both the ability to perform threat detection tests on data received from an unsecured network 106 and on data received from a secured network 106, a security guard 104 can be directed to performing threat detection tests on either inbound traffic or outbound traffic, in some embodiments. Further, the threat detection tests recited herein are illustrative and the types of tests should not be viewed as limiting the embodiments of the present disclosure.

Figure 2:
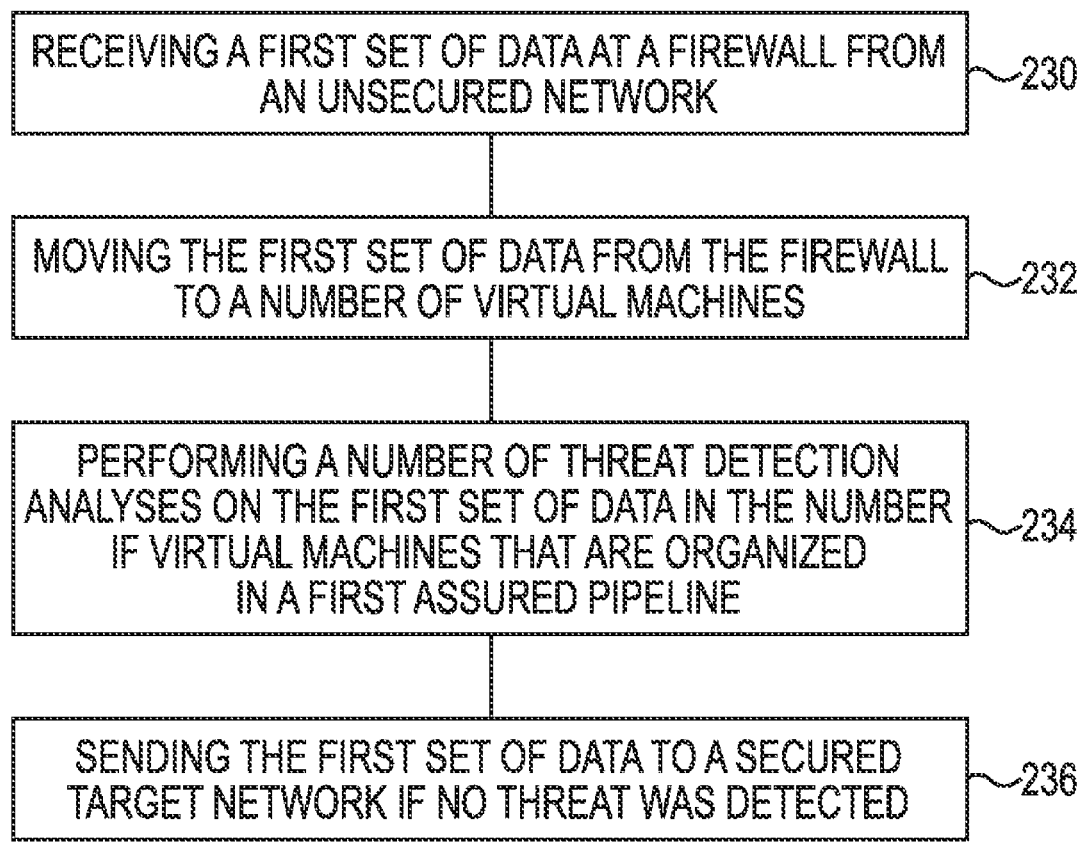
FIG. 2 is a flow chart illustrating an example of a method for threat detection using an assured pipeline in accordance with one or more embodiments of the present disclosure.

FIG. 2 is a flow chart illustrating an example of a method for threat detection using an assured pipeline in accordance with one or more embodiments of the present disclosure. The method can detect security threats in a data received from an unsecured network. The method can also deliver data to a secured network depending on the outcome of the security threats.

At 230, a first set of data is received at a firewall from an unsecured network. The first set of data can, for example, include a data carrying signal that can include a security threat. A firewall can block a first set of data from being delivered to a secured network if the firewall determines that the first set of data includes a security threat.

At 232, the first set of data is moved from the firewall to a number of virtual machines. The virtual machines can include the ability to perform a number of threat detection analyses in isolation. That is, virtual machines can allow for different threat detection analyses to be performed independently of each other.

At 234, a number of threat detection analyses can be performed on the first set of data in the number of virtual machines that are organized in a first assured pipeline. The virtual machines in an assured pipeline can follow a set of processing steps in order for data to pass from a first virtual machine to a second virtual machine. For example, a set of processing steps can be performed in a first virtual machine before the data can move to a second virtual machine.

A set of processing steps can be associated with the threat detection analyses being performed in a virtual machine. For example, a first virtual machine that performs a first threat detection analysis can include a first set of processing steps and a second virtual machine that performs a second threat detection analysis that differs from the first threat detection analysis can include a second set of processing steps, such that the first set of processing steps and the second set of processing steps differ.

A number of threat detection analyses can be performed in a predefined order. For example, a first number of threat detection analyses can be performed in a first order for a first type of data and a second number of threat detection analyses can be performed in a second order for a second type of data.

Furthermore, in various embodiments, the first number of threat detection analyses for a first type of data can differ from the second number of threat detection analyses for a second type of data when the first type of data and the second type of data differ. The order and number of threat detection analyses that are performed on a set of data can also differ depending, for example, on the source of the data, among other criteria.

At 236, the first set of data can be sent to a secured target network if no threat (e.g., security threats) were found. A guard system can stop the delivery of a first set of data if a security threat is found at any stage of the delivery process. A security system can stop the delivery at a firewall and/or at any of the number of virtual machines.

Moreover, a guard system can allow a number of threat detection analyses to be performed after a security is found before the guard system stops the delivery of the data to the secured network. Additionally, a guard system can stop the progress of an assured pipeline as soon as a security threat is found.

Figure 3:
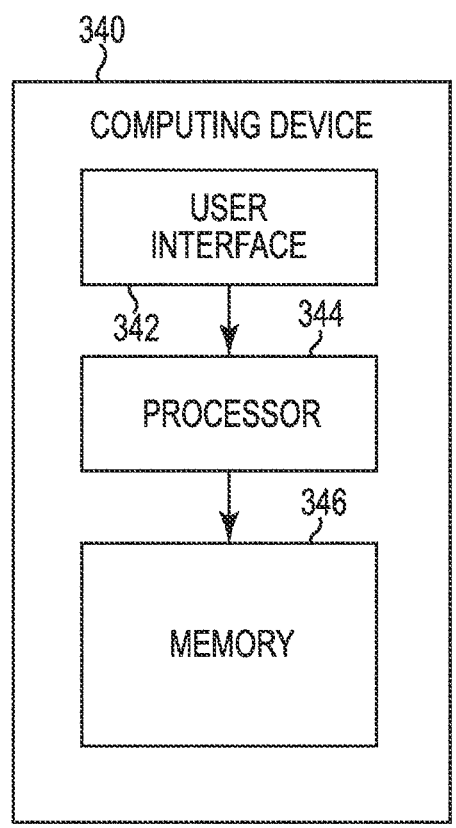
FIG. 3 illustrates a computing device for threat detection using an assured pipeline in accordance with one or more embodiments of the present disclosure.

FIG. 3 illustrates a computing device for threat detection using an assured pipeline according to one or more embodiments of the present disclosure. Computing device 340 can be, for example, a desktop computing device, a laptop computing device, or a portable handheld computing device, such as, for instance, a portable handheld mobile phone, media player, or scanner. However, embodiments of the present disclosure are not limited to a particular type of computing device.

In some embodiments, computing device 340 can be a part of an access control and/or monitoring system. For example, computing device 340 can be part of an access control device (e.g., card reader, flash device port).

In the embodiment of FIG. 3, computing device 340 includes a user interface 342. User interface 342 can be a graphical user interface (GUI) that can provide (e.g., display and/or present) and/or receive information (e.g., data and/or images) to and/or from a user (e.g., operator) of computing device 340.

For example, user interface 342 can include a screen that can provide information to a user of computing device 340 and/or receive information entered into a display on the screen by the user. However, embodiments of the present disclosure are not limited to a particular type of user interface.

As shown in FIG. 3, computing device 340 includes a processor 344 and a memory 346 coupled to the processor 344. Memory 346 can be volatile or nonvolatile memory. Memory 346 can also be removable (e.g., portable) memory, or non-removable (e.g., internal) memory. For example, memory 346 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although the user interface 342, processor 344, and memory 346 are illustrated as being located in computing device 340, embodiments of the present disclosure are not so limited. For example, memory 346 can also be located internal to another computing resource (e.g., enabling computing device readable instructions to be downloaded over the Internet or another wired or wireless connection).

Memory 346 can also store executable instructions, such as, for example, computing device readable instructions (e.g., software), for threat detection using an assured pipeline in accordance with one or more embodiments of the present disclosure.

Processor 344 can execute the executable instructions stored in memory 346 to perform threat detection using an assured pipeline in accordance with one or more embodiments of the present disclosure. For example, processor 344 can execute the executable instructions stored in memory 346 to receive a first set of data from a first user located in a secured network, move the first set of data to a number of virtual machines, perform a number of threat detection analyses on the first set of data in the number of virtual machines that are organized in a first assured pipeline, move the first set of data from the number of virtual machines to a firewall if the first set of data is not a threat, and send the first set of data from the firewall to a second user that is located in an unsecured network.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device implemented method for threat detection using an assured pipeline, comprising:
   receiving a first set of data at a firewall from an unsecured network;
   moving the first set of data from the firewall to a number of virtual machines (VM) including at least a first VM and a second VM;
   performing a number of threat detection analyses on the first set of data in the number of virtual machines including at least the first VM and the second VM that are organized in a first assured pipeline;
   wherein the first set of data is moved between the number of virtual machines including at least the first VM and the second VM after the number of threat detection analyses have occurred; and
   wherein the first VM and the second VM perform different threat detection analyses from the number of threat detection analyses; and
   sending the first set of data to a secured target network if no threat was detected.

2. The method of claim 1, wherein the method further includes receiving a second set of data and moving the data to a second assured pipeline.

3. The method of claim 1, wherein receiving the first set of data at the firewall includes receiving a first set of executable instructions.

4. The method of claim 1, wherein performing the number of threat detection analyses on the first set of data in the number of virtual machines that are organized in the first assured pipeline includes beginning the threat detection analysis and ending the threat detection analysis on each of the number of virtual machines sequentially.

5. The method of claim 4, wherein performing the number of threat detection analyses on the first set of data in the number of virtual machines includes performing the number of threat detection analysis in a predefined order.

6. The method of claim 1, wherein performing the number of threat detection analyses on the first set of data in the number of virtual machines includes running a number of operating systems on the number of virtual machines wherein each of the number of virtual machines runs one of the number of operating systems.

7. The method of claim 1, wherein performing the number of threat detection analyses includes a number of programs for performing a number of threat detection analyses wherein the number of programs run on the number of virtual machines.

8. The method of claim 7, wherein performing the number of threat detection analyses on the first set of data in the number of virtual machines can include:
  running a first program that performs antivirus threat detection in a first virtual machine;
  installing the first set of data in a second virtual machine and running a second program to monitor the second virtual machine for undesired behavior;
  installing the first set of data in a third virtual machine and running a third program to monitor network traffic to the third virtual machine for undesirable behavior.

9. The method of claim 1, wherein the method further includes logging the first set of data and associating it with a user from the secured target network.

10. The method of claim 1, wherein receiving the first set of data includes receiving a signature with the first set of data and wherein sending the first set of data to a secured target network includes sending the first set of data to a secure target network if the signature is in an approved list of signatures.

11. A non-transitory computing device readable medium storing instructions for assured pipeline threat detection executable by a computing device to cause a computing device to:
  receive a first set of data from a first user located in a secured network;
  move the first set of data to a number of virtual machines (VM) including at least a first VM and a second VM;
  performing a number of threat detection analyses on the first set of data in the number of virtual machines including at least the first VM and the second VM that are organized in a first assured pipeline;
    wherein the first set of data is moved between the number of virtual machines including at least the first VM and the second VM after the number of threat detection analyses have occurred; and
    wherein the first VM and the second VM perform different threat detection analyses from the number of threat detection analyses; and
  move the first set of data from the number of virtual machines to a firewall if the first set of data is not a threat; and
  send the first set of data from the firewall to a second user that is located in an unsecured network.

12. The computing device readable medium of claim 11, wherein the instructions to receive the first set of data from the user located in the secured network include instructions to log the first set of data and associate the data with the user.

13. The computing device readable medium of claim 11, wherein the instructions to perform the number of threat detection analyses include instructions to compare the first set of data with a list of approved data and classify the data as non-threatening if the first set of data is on the list of approved data.

14. The computing device readable medium of claim 11, wherein the instructions to perform the number of threat detection analyses include instructions to classify the first set of data as non-threatening if the first set of data has no hidden data.

15. The computing device readable medium of claim 11, wherein the instructions to perform the number of threat detection analyses include instructions to compare the second user to an approved user list and classify the first set of data as not a threat.

* * * * *